April 30, 1957     O. J. ZANDER     2,790,378
EGG BOILER

Filed Nov. 8, 1955                                        2 Sheets-Sheet 1

INVENTOR.
Otto J. Zander.
BY
AGENT.

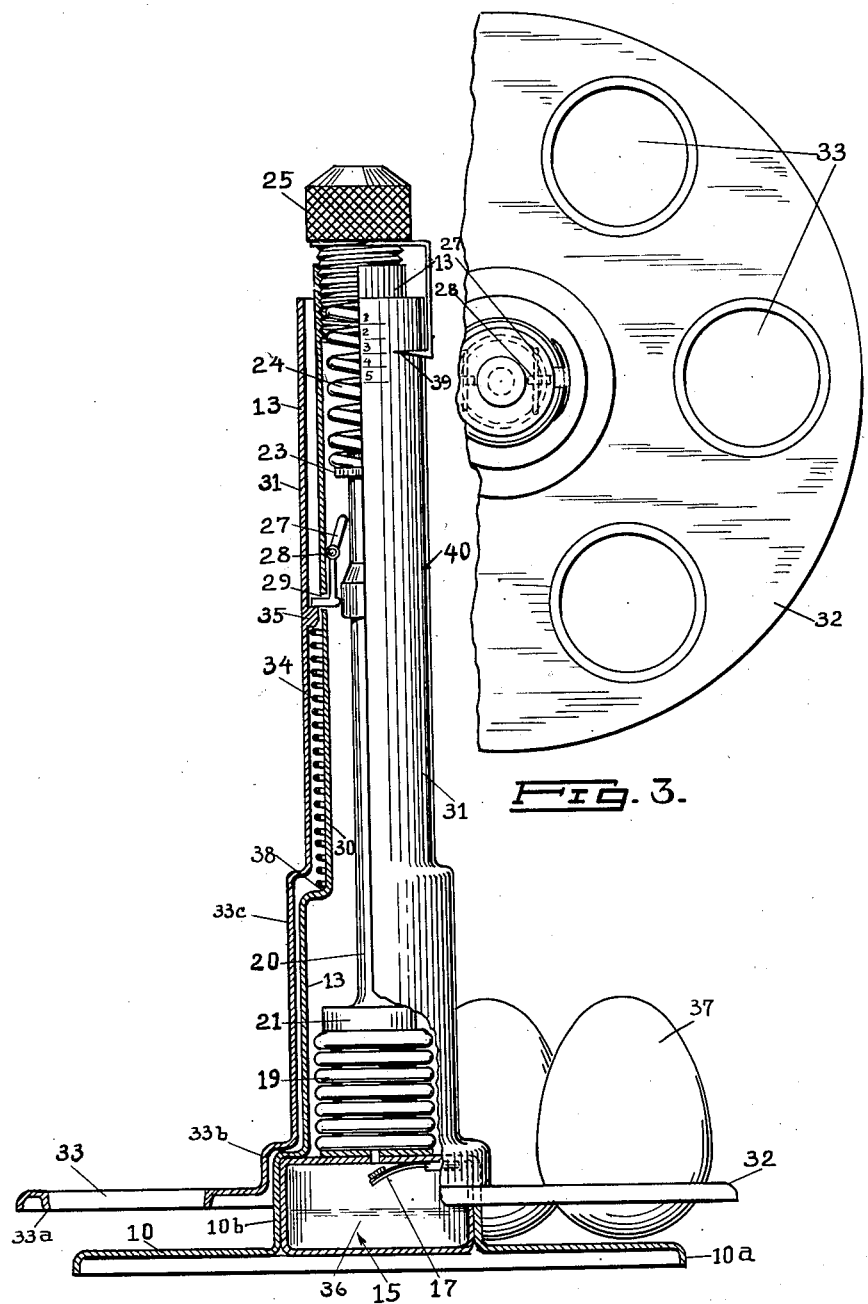

United States Patent Office 2,790,378
Patented Apr. 30, 1957

2,790,378

EGG BOILER

Otto J. Zander, Harrington Park, N. J.

Application November 8, 1955, Serial No. 545,629

4 Claims. (Cl. 99—336)

This invention relates to egg boiling devices and more particularly to devices of this character wherein the time of boiling is automatically controlled in accordance with a predetermined setting.

It is an object of the present invention to provide an egg boiling device which will automatically remove the eggs from boiling water upon their having been boiled a predetermined time.

It is another object of the present invention to provide an egg boiler of the above type which includes thermostatic control means for removing the eggs from the boiling water after they have been subjected to the same for a predetermined period.

Other objects of the invention are to provide an egg boiler bearing the above objects in mind which is of simple construction, has a minimum number of parts, is inexpensive to manufacture and efficient in use.

For other objects and a better understanding of the invention, reference may be had to the following detailed description taken in connection with the accompanying drawing, in which:

Fig. 2 is a view similar to Fig. 1 but showing the device in the operative egg boiling position before being raised; and Fig. 3 is a fragmentary top plan view thereof.

Figure 1:
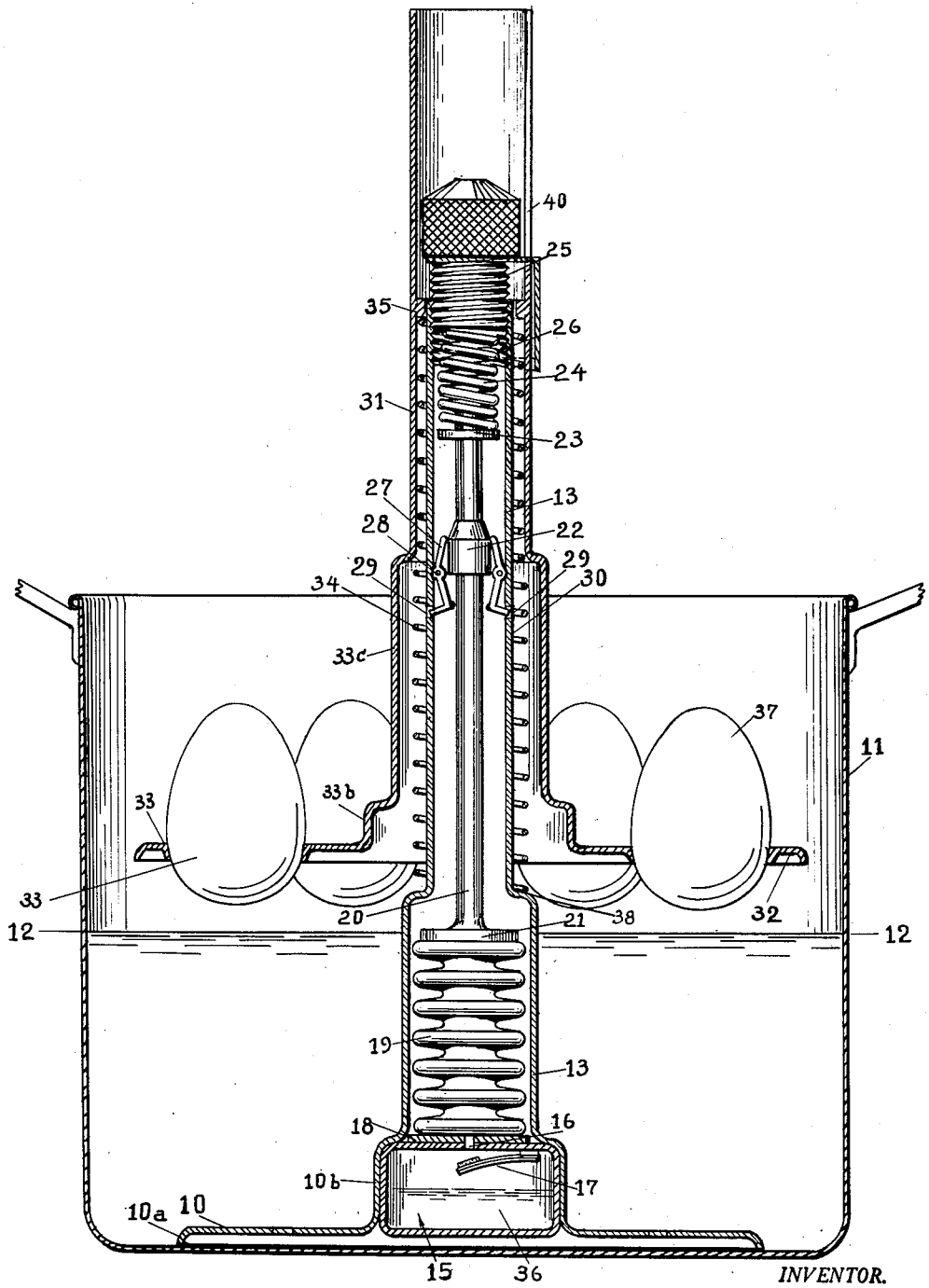
Figure 1 is a vertical sectional view shown partly in elevation and of a preferred embodiment of the present invention and showing the device in the egg raised, inoperative position after the eggs have been boiled for a predetermined period of time.

Referring now more in detail to the drawing, the device comprises generally a vertically tubular rod projecting upwardly from a base of circular shape adapted to rest on the bottom of a receptacle in which the water is boiled. Slidably mounted on the tubular guide is a tray or rack with seating means for holding the eggs in an upright position, said rack being urged upwardly by spring means which tends to lift the tray out of the water. The tray is normally retained in its lowered position by latch means which is released by a thermostatic device, which latter may be controlled so as to determine the number of minutes during which the eggs are to be boiled. By merely setting the timer for the required period, one can thus be sure without further attention of having the eggs boiled to the desired degree.

11 indicates a receptacle of suitable size and shape and in which the water is to be boiled.

In the practice of my invention, a circular flange 10 is integrally formed around its periphery with a downwardly turned flange 10a and which is supported on the bottom of the receptacle 11. The center of the plate 10 is integrally formed with a raised, hollow cylindrical portion 10b which is in turn integrally formed with a reduced hollow, cylindrical elongated portion 13, the latter in turn being integrally formed with a further elongated reduced hollow cylindrical portion 30 which extends upwardly above the top of the receptacle a considerable distance.

The upper end of the elongated portion 30 is in turn internally threaded and has screwed therein an externally threaded time setting screw 24 having an enlarged, externally knurled head for adjustment purposes.

A helical coil spring 34 sleeves the tubular guide 30, the lower end thereof resting on the shoulder 38 provided intermediate portions 30 and 13.

A circular tray 32 having a down turned peripheral flange is provided with a plurality of openings 33 which support therein the eggs 37 in an upright position, the openings 33 being provided with peripheral flanges 33a to facilitate the positioning of the eggs. The tray 32 is integrally formed with a raised hollow cylindrical portion 33b which slides downwardly over the portion 10b of the base member, the cylindrical portion 33b being in turn integrally formed with a reduced hollow cylindrical portion 33c which is adapted to slide past the coil spring 34. The cylindrical portion 33c is in turn integrally formed with a reduced elongated, hollow cylindrical portion 31 which also slidably receives therethrough the spring 34 and guide 30 (Fig. 1), the upper end of the cylindrical portion 31 being provided with an elongated, vertical slot 40 for a purpose which will hereinafter become clear. Near its midpoint the cylindrical portion 31 is integrally formed with an internal shoulder 35 which abuts the upper end of the coil spring 34 whereby to normally retain the tray 32 in a raised position of Fig. 1 with the eggs raised above the level of the water.

In order to retain the tray and eggs in the lowered operative position of Fig. 2, the guide 30 pivotally mounts by means of the pins 28 a pair of oppositely disposed latch members 27 which extend outwardly through openings 29 in the guide 30 to engage the upper edge of the shoulder 35 whereby to retain the tray in the lowered position against the action of the spring 34, as will be obvious.

As a means of retaining the latches 27 in the operative position of Fig. 2 and as a means of subsequently moving them to an inoperative position to release the tray, a hollow tank 15 is positioned within the cylindrical portion 10b and is provided with a top central outlet opening 16. The tank 15 is partially filled with etherial oil or other suitable material which when heated by the boiling water will vaporize and expand. A bimetallic valve 17 is fixed at one end to the top wall of the tank and is adapted to close the outlet opening 16 upon being heated. A bellows 19 is secured to the top of the tank 15 in communication with the outlet opening 16 thereof by means of a flange 18, an elongated rod 20 being fixedly mounted at the upper end of the bellows 19 by means of flange 21. A cam surface 22 is mounted on the rod 20 and includes an enlarged cylindrical portion adapted to retain the latches 27 in the operative position of Fig. 2 and a frusto-conical upper portion adapted to engage the upper ends of the latches 27 and to move the lower ends thereof out of engagement with shoulder 35 upon the rod 20 moving upwardly, as will hereinafter become clear. A collar 23 is secured to the upper end of the rod 20 and seats thereon the lower end of a helical coil spring 24, the upper end of which bears on the adjustment screw 25 whereby to normally retain the rod 20 in the lower, inoperative position of Fig. 2.

In operation, the device will normally be retained in the egg boiling position of Fig. 2 by means of the latches 27 which engage shoulder 35, the cam surface 22 serving to retain the latches in the cylindrical portion, preventing inward displacement of the lower ends of the latches, as will be obvious. The bimetallic valve 17 is adapted to close the opening 16 upon the temperature of the water reaching 212 degrees F. However, before the bimetallic valve closes, part of the liquid 36 will have vaporized and entered the bellows 19. Thus, a closed system is formed consisting of the bellows 19 and the vapors contained therewithin. Further heating in the water will increase the pressure of the vapors within the bellows to move the rod 20 upwardly against the action of spring 24 to ultimately have the frusto-conical portion of cam surface 22 move the upper ends of the latches 27 outwardly and the lower ends thereof inwardly through openings 29 to release the shoulder 35, the spring 34 then raising the tray to the inoperative position above the level of the water, as shown in Fig. 1. It will be noted that the liquid 36 will vaporize as the water is coming to the boiling temperature and before the valve 17 closes. By varying the position of the screw 25 the tension of the spring 24 may be varied to vary the amount of time necessary after the water has reached the boiling point to raise the rod 20 and to release the latches 27, as will be obvious. A scale may be provided at the upper end of the sleeve 40, graduated in minutes and which cooperates with a finger 39 fixedly carried at the top of the screw 25, the finger 39 moving in slot 40. In setting the device, as the cylindrical portion 22 moves downwardly, it will engage the lower ends of the latches 27 to force them outwardly through the openings 29. The time necessary for the latches 27 to be released will vary from one to five minutes and can be adjusted or set by means of the screw 25. After the device has released the tray 32, the eggs will be suspended above the water level to be retained in a warm condition for a relatively long period of time. When the device has been removed from the hot water, the tank 15 will cool, cooling the bimetallic valve 17 which will open and also cooling the vapors within the bellows 19 which will return to the tank for the next boiling operation.

While various changes may be made in the detail construction, it shall be understood that such changes shall be within the spirit and scope of the present invention, as defined by the appended claims.

To reset the device, it is removed from the boiling water whereupon the tray 32 is brought downwardly against the base 10 against the action of spring 34 by means of manual pressure. The base of the device is then held under cold water, causing the bellows 19 to contract, and forcing the latches outwardly under the action of the returning cylindrical portion 22, as will be obvious.

What I claim as new and desire to protect by Letters Patent of the United States is:

1. A device for boiling eggs a predetermined period of time comprising guide means adapted to rest on the bottom of a receptacle containing water to be boiled, a tray slidably mounted on said guide means adapted to hold the eggs to be boiled, spring means for raising said tray to an inoperative position above the level of the water in the receptacle, latch means for retaining said tray in the operative position against the action of said spring means and means for responding to the temperature of the water for releasing said latch means after a predetermined period of time, said temperature responsive control means being adjustable to vary the egg boiling time, said guide means comprising a flat plate adapted to rest on the bottom of the receptacle containing the water to be boiled and a hollow elongated cylindrical tube extending upwardly and fixedly connected thereto, said cylindrical member having a first hollow enlarged portion at the bottom thereof forming a shoulder, said spring means comprising a coil spring sleeving said first cylindrical elongated member with the lower end thereof resting on said shoulder, said tray means comprising a flat member having egg supporting openings therewithin arranged concentrically with the center of said plate, said plate having a central opening receiving said first cylindrical portion and enlargement thereof and spring therethrough, a sleeve surrounding said plate opening and extending upwardly therethrough in freely spaced relationship to said first cylindrical member and spring, said sleeve at the upper end thereof having a reduced hollow cylindrical portion extending upwardly therefrom slidably receiving said first cylindrical portion and spring therethrough, an annular ridge within said reduced portion abutting the upper end of said spring whereby to retain said plate above the water level when said latch means are released, said latch means comprising a pair of substantially V-shaped levers pivotally mounted at their centers on opposite sides of said first cylindrical portion at the interior thereof, fingers connected to the lower ends of said levers, said first cylindrical portion having oppositely disposed openings adapted to receive said fingers outwardly therethrough to permit the latter to move into engagement with the upper surface of said ridge, an elongated rod slidably mounted within said first cylindrical portion, a cylindrical enlargement carried by said rod adapted to force the lower ends of said levers and said fingers outwardly when positioned adjacent thereto, and spring means for retaining said rod in a lowered position with said cylindrical portion abutting said fingers and retaining the latter in the operative position.

2. A device according to claim 1, said temperature responsive control means comprising a second enlarged hollow portion at the lower end of said first cylindrical portion enlargement, a closed tank within said enlargement, said tank containing a vaporizable liquid adapted to vaporize while the water is reaching the boiling point, a closed bellows positioned within said first cylindrical portion first enlargement above said tank, said tank having an opening communicating with said bellows, the lower end of said rod being connected to the upper end of said bellows, and a bimetallic element positioned within said tank having one end secured thereto, the other end of said bimetallic element being adapted to close said tank opening upon the water reaching the boiling point, whereby to seal the vaporized material within said bellows and to cause said bellows to expand upon further heating.

3. A device according to claim 2, said second spring means comprising a collar at the upper end of said rod a frusto conical portion at the upper end of said enlarged cylindrical portion adapted to engage the upper ends of said levers and to move said fingers to an inoperative position upon upward movement of said rod under the action of said vaporized material in said bellows, the upper end of said first cylindrical portion being internally threaded, an adjustment screw within said internally threaded upper portion, and a coil spring sleeving the upper end of said rod at the lower end thereof in abutment with said collar and the upper end thereof in abutment with said adjustment screw.

4. A device according to claim 3, said adjustment screw having an enlarged manually operable head, an indicating finger depending from said head adapted to move downwardly with said adjustment screw, said sleeve reduced portion at the upper end thereof having a downwardly extending slot receiving said indicator finger therethrough and a scale carried by said first cylindrical portion adapted to cooperate with said finger whereby to indicate the predetermined period of time.

References Cited in the file of this patent

UNITED STATES PATENTS

| 2,739,524 | Purpura | Mar. 27, 1956 |

FOREIGN PATENTS

| 2,750 | Great Britain | 1867 |
| 595,403 | France | July 16, 1925 |